United States Patent
Sridhar

(10) Patent No.: US 10,929,106 B1
(45) Date of Patent: Feb. 23, 2021

(54) SEMANTIC ANALYZER WITH GRAMMATICAL-NUMBER ENFORCEMENT WITHIN A NAMESPACE

(71) Applicant: Zoho Corporation Private Limited, Pleasanton, CA (US)

(72) Inventor: Bharath Sridhar, Cupertino, CA (US)

(73) Assignee: Zoho Coroporation Private Limited, Kanchipuram District (IN)

( * ) Notice: Subject to any disclaimer, the term of this patent is extended or adjusted under 35 U.S.C. 154(b) by 0 days.

(21) Appl. No.: 16/534,105

(22) Filed: Aug. 7, 2019

Related U.S. Application Data

(60) Provisional application No. 62/718,056, filed on Aug. 13, 2018.

(51) Int. Cl.
  *G06F 8/33* (2018.01)
  *G06F 40/30* (2020.01)
  *G06F 40/253* (2020.01)

(52) U.S. Cl.
  CPC .............. *G06F 8/33* (2013.01); *G06F 40/253* (2020.01); *G06F 40/30* (2020.01)

(58) Field of Classification Search
  None
  See application file for complete search history.

(56) References Cited

U.S. PATENT DOCUMENTS

| | | | |
|---|---|---|---|
| 5,748,966 A * | 5/1998 | Sato ........................ | G06F 8/437 717/116 |
| 7,222,119 B1 | 5/2007 | Ghemawat et al. | |
| 7,694,274 B2 * | 4/2010 | Meijer ................ | G06F 9/44589 717/114 |
| 7,937,453 B1 | 5/2011 | Hayden et al. | |
| 9,411,804 B1 * | 8/2016 | Kaeser ..................... | G06F 40/40 |
| 9,977,693 B2 * | 5/2018 | Potash ..................... | G06F 12/00 |
| 2002/0166114 A1 * | 11/2002 | Proebsting ............. | G06F 8/423 717/142 |
| 2004/0030715 A1 * | 2/2004 | White .................... | G06F 16/289 |
| 2006/0047500 A1 * | 3/2006 | Humphreys .......... | G06F 40/295 704/9 |

(Continued)

OTHER PUBLICATIONS

Oracle, "Chapter 5. Conversions and Promotions", 2017, Oracle at https://docs.oracle.com/javase/specs/jls/se7/html/jls-5.html (Year: 2017).*

(Continued)

*Primary Examiner* — Hossain M Morshed
(74) *Attorney, Agent, or Firm* — Arthur Behiel; Mark Lauer; Silicon Edge Law Group LLP

(57) ABSTRACT

A software development environment supports grammatical-number enforcement on the names of different data types. The development environment, a computer system that programmers use to create and maintain a computer program, employs a namespace of symbolic names that are unique within a set of expressions available to the program. A type checker ensures that each name identifying an expression in a namespace does not have more than one data type. Thus, for instance, the variable "chair" cannot be both an integer and a character string. A grammatical-number enforcer with access to a dictionary enforces a naming convention within the namespace that groups grammatical-number name variants by data type to reduce type errors and thus speeds up the development environment.

19 Claims, 2 Drawing Sheets

(56) References Cited

U.S. PATENT DOCUMENTS

| | | | | |
|---|---|---|---|---|
| 2010/0069035 | A1* | 3/2010 | Johnson | H04W 92/18 455/404.1 |
| 2010/0235812 | A1* | 9/2010 | Fujii | G06F 40/274 717/120 |
| 2011/0208728 | A1* | 8/2011 | Ikawa | G06F 16/345 707/723 |
| 2012/0137268 | A1* | 5/2012 | Dattke | G06F 8/33 717/105 |
| 2014/0282443 | A1* | 9/2014 | Hoban | G06F 8/437 717/143 |
| 2014/0310278 | A1* | 10/2014 | D'Amato | G06F 16/13 707/737 |
| 2014/0380276 | A1* | 12/2014 | Matthiesen | G06F 8/75 717/123 |
| 2015/0278397 | A1* | 10/2015 | Hendrickson | G06F 16/9024 707/798 |

OTHER PUBLICATIONS

Wikipedia, "Grammatical number," https://en.wikipedia.org/w/index.php?title=Grammatical_number&oldid=818780802, last edited Jan. 5, 2018 (12 pages).

Wikipedia, "Strong and weak typing," https://en.wikipedia.org/w/index.php?title=Strong_and_weak_typing&oldid=819903165, last edited Jan. 11, 2018 (3 pages).

Wikipedia, "Solution stack," https://en.wikipedia.org/w/index.php?title=Solution_stack&oldid=822975608, last edited Jan. 29, 2018 (4 pages).

Wikipedia, "Namespace," https://en.wikipedia.org/w/index.php?title=Namespace&oldid=801167721, last edited Sep. 18, 2017 (10 pages).

Wikipedia, "Property (programming)," https://en.wikipedia.org/w/index.php?title=Property_(programming)&oldid=806541384, last edited Oct. 22, 2017 (9 pages).

Wikipedia, "Programming language," https://en.wikipedia.org/w/index.php?title=Programming_language&oldid=819593225, last edited Jan. 10, 2018 (17 pages).

Wikipedia, "Expression (computer science)," https://en.wikipedia.org/w/index.php?title=Expression_(computer_science)&oldid=803727099, last edited Oct. 4, 2017 (2 pages).

Wikipedia, "Data type," https://en.wikipedia.org/w/index.php?title=Data_type&oldid=819426053, last edited Jan. 9, 2018 (6 pages).

Wikipedia, "Type system," https://en.wikipedia.org/w/index.php?title=Type_system&oldid=819141780, last edited Jan. 7, 2018 (12 pages).

* cited by examiner

SEMANTIC ANALYZER WITH GRAMMATICAL-NUMBER ENFORCEMENT WITHIN A NAMESPACE

BACKGROUND

A computer program is a collection of instructions that performs a specific task when executed by a computer. Programs are usually written by computer programmers in programming languages, which are formal languages that specify sets of instructions to be "executed on," or carried out by, a computer. These instructions act on data of various types to produce different kinds of outputs. In a simple example, a program might specify variables A and B of type "integer" and include an instruction for summing those variables. A user "running" the program on a general-purpose computer would thereafter be able to enter a pair of integers A and B to obtain the sum A plus B.

Modern computers and computer systems have moved well beyond simple arithmetic and integers are among the simplest of many data types. Fundamental data types include character strings char, integers int, and floating-point numbers float. Programmers can use or define other so-called "derived data types" that are aggregates of fundamental data types. For example, a programmer might define data of type "patient" that includes text strings for names and phone numbers, integers for birthday and weight, floating-point numbers for test results, etc.

The ability of programmers to use and define data types is very powerful but can make it difficult for programmers to avoid conflicts in the way variable expressions are used and defined. Such conflicts produce program errors, or "bugs," that can be extremely difficult to pinpoint and correct. A common bug is the "type error," which occurs when the data type specified for a function does not agree with the type of data provided to the function. For example, a programmer might declare a function Concatenate(A,B) that concatenates character strings Char and a function Sum(X,Y) sums integers X and Y. Providing function Concatenate(A,B) with A=abc and B=def would return abcdef, while providing function Sum(X,Y) with X=3 and Y=4 would return 7. However, providing A=abc and B=3 to function Concatenate(A,B) or X=abc and Y=3 to function Sum(X,Y) would return values that are not likely intended by the programmer or programmers, a condition that results in a type error. Large bodies of program code include myriad variables declared (named and typed) by different programmers. Adding to the complexity of the programming environment, organizations and collections of organizations employ networks of co-located or distant computers running interrelated programs that are designed, written, and maintained by programmers widely distributed across space and time. Mismatching data types with similar names are bound to appear.

Computer programs are confined within a "namespace" to prevent the creation of conflicting data types. A namespace for a program is a set of symbolic names that are unique within the set of expressions available to the program. In this context an "expression" is a combination of explicit values, constants, variables, operators, and functions that a programming language interprets and computes to return results. Software tools called "type checkers" verify and enforce type constraints on the expressions within a namespace. Type checkers make sure that each name identifying an expression in a namespace does not have more than one data type. Thus, for instance, the symbolic name "weight" cannot refer to both an integer and a floating-point number within the same namespace. Type checking can happen when a program is compiled to machine-readable form, when the program is run, or using a combination of these approaches. Type errors remain problematic despite diligent programing and complex tools.

BRIEF DESCRIPTION OF THE DRAWINGS

The subject matter disclosed is illustrated by way of example, and not by way of limitation, in the following figures.

DETAILED DESCRIPTION

Figure 1:
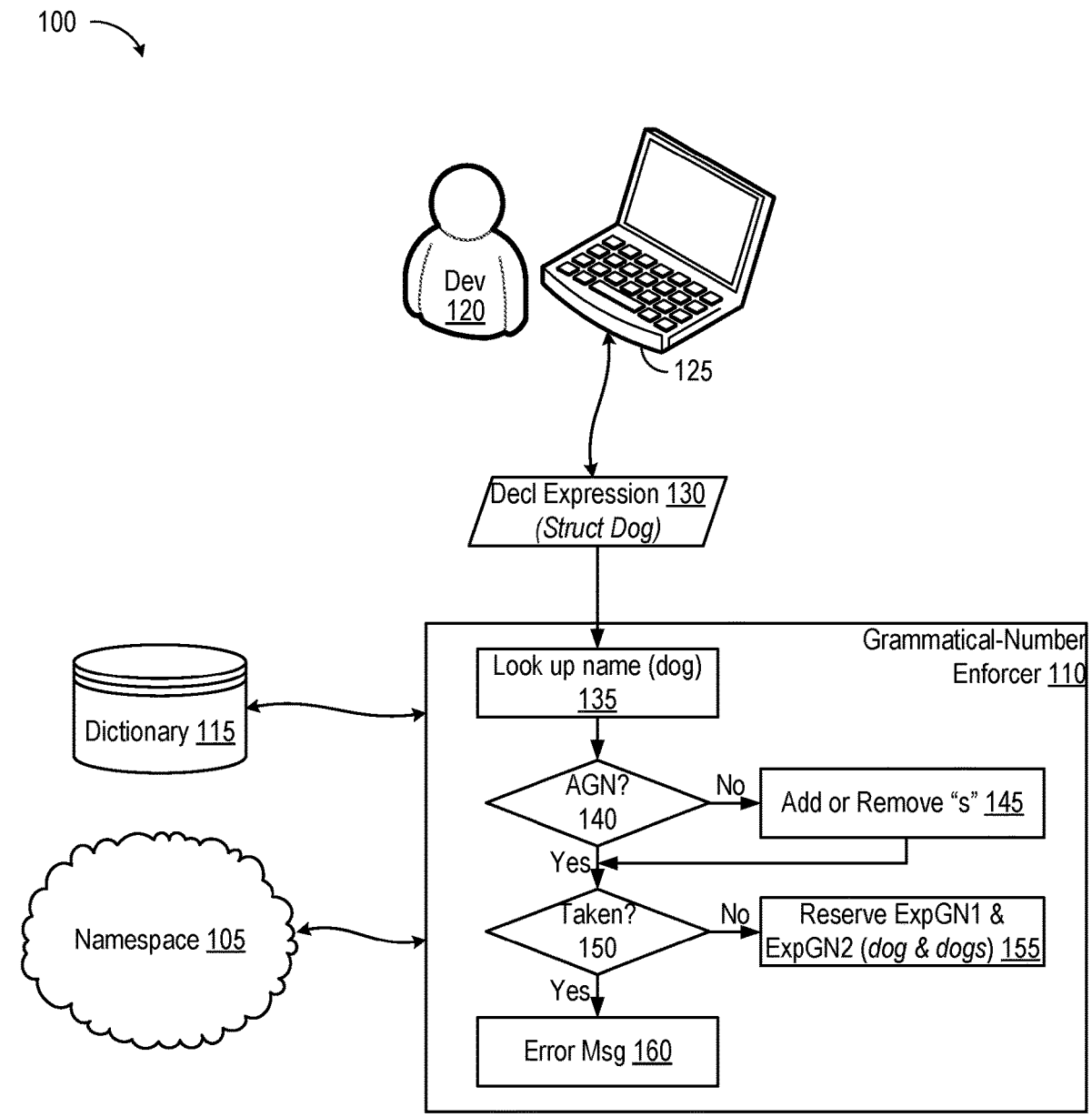
FIG. 1 is a diagram illustrating a system 100 for reducing compile-time errors in a computer program.

FIG. 1 is a diagram illustrating a system 100 for reducing compile-time errors in a computer program (not shown) prior to running the program. The computer program employs a namespace 105 of expressions. A grammatical-number enforcer 110 with access to one or more local or remote dictionaries 115 enforces a naming convention within namespace 105 that simplifies type creation and reduces type errors.

A programmer 120 working with a development environment, represented here as a computer 125, writes and modifies source code that defines the functionality of a computer program under development. The development environment includes a grammatical-number enforcer 110, itself a program or program module, that takes as input a declaration 130 derived from the source code. Declaration 130 is a request of the computer program to couple a symbolic name to a data type and add that name to the namespace of expressions. "Struct" (for "structure") in the C programming language is a composite data-type declaration that defines a physically grouped list of variables. A designated Struct can include data of different types. In this example declaration 130 couples a symbolic name Dog to a data type Struct. The resultant declared variable Dog groups a character string *owner with an integer value for age. A struct declaration in the C programming language might be as follows:

```
struct dog {
  char *owner;
  int age;
};
```

This declaration defines a new type struct dog. To create a new variable Spot of type struct dog, programmer 120 writes:

struct dog Spot;

Variable Spot has a character component, accessed by Spot.owner, and an integer component, accessed by Spot.age. Derived data type struct dog could be extended to include many more variables of interest in e.g. a database of dogs but is simplified for brevity, as will be appreciated by those of skill in the art of computer programming.

Responsive to declaration 130, grammatical-number enforcer 110 looks up the descriptive name "dog" in dictionary 115 to find variants of "dog" with different grammatical numbers. A grammatical number is a grammatical category of expressions that indicates a count designated by the expression. The English language generally includes two grammatical numbers, one indicative of a singular count and another of a plural count. The descriptive name "dog"

applied to the expression "struct dog" is singular, and thus has a grammatical number of one. Grammatical-number enforcer 110 retrieves variants of the term "dog" that have a different grammatical number, such as the grammatical-number variant "dogs" (step 135).

Declared variables may not have a dictionary entry with a different grammatical number. Per decision 140, if no alternative grammatical-number (AGN) entries are included in dictionary 115 then grammatical-number enforcer 110 may simply add or remove an "s" (145). Grammatical-number enforcer 110 can also use context, such as variable type, to determine whether to create a grammatical-number variant of a declared expression. A variable MPG (MPGs) of type integer may be assumed to have a grammatical-number variant MPGs (MPG) for example.

Once grammatical-number enforcer 110 has a list that includes the descriptive name of the initially declared expression and any grammatical-number variants, dog and dogs in this example, grammatical-number enforcer 110 queries namespace 105 to find whether any of those expressions are taken (decision 150). If not, then grammatical-number enforcer 110 adds the declared expression to namespace 105 and reserves the alternative grammatical-number variant or variants. In this example grammatical-number enforcer 110 adds the expressions dog to namespace 105, noting type struct dog and the component character and integer types, and likewise adds the grammatical-number variant dogs to namespace 105. The declaration 130 that created a new type struct dog thus automatically reserves or creates a new type struct dogs (155) that is constrained to the same data type as the originating declaration 130. Programmer 110, without having to declare a type struct dogs (plural) can thus create new expressions that are type-consistent with type struct dog (singular).

Grammatical-number enforcer 110 is not limited to pairs of grammatical-number variants. Dictionary 115 might relate the descriptive name dog to the singular synonym hound and grammatical-number variants dogs, hounds, or even doggies, for example. In this hypothetical a declaration setting the type for any expression of dog, dogs, hound, hounds, doggy, or doggies establishes the data type for all six of these name variants as they relate to expressions within namespace 105.

If grammatical-number enforcer 110 determines that the descriptive name designated in declaration 130 or a grammatical-number variant is taken (decision 150) then grammatical-number enforcer 110 returns a descriptive error message 160 to programmer 120 via computer 125 explaining the type error.

Programmer 120, or any programmer with access to namespace 105, can create a new variable Sheppard of type struct dogs using the expression:
struct dogs Sheppard;
Variable Sheppard is constrained to a group of types struct dog.

The foregoing example assumes that "dog" was an available name and that grammatical-number enforcer 110 reserved both "dog" and "dogs" of the same data type responsive to declaration 130. Grammatical-number enforcer 110 likewise checks the grammatical number of new names expressed in plural forms (e.g. children) and, where detected, reserves the singular variant (e.g. child).

Grammatical-number enforcers in accordance with some embodiments enforce grammatical-number restrictions without automatically including alternative expressions in namespace 105. For example, such embodiments may check new plural or singular expressions against entries in namespace 105 and reject requests for expressions with identifiers that correspond with entries in namespace 105 that differ only in grammatical number and have a different type or types. If namespace 105 includes a type "children," for example, attempts to declare a new type "child" that is type mismatched to "children" would produce an error message.

Grammatical-number enforcer 110 can enforce grammatical-number restrictions at different levels of a hierarchy of types within and between namespaces. Returning to the example of type struct dog, recall that variables of this type include components that are themselves type constrained, character string owner and integer age. The component name "owner" is singular, and thus has a grammatical number of one. Grammatical-number enforcer 110, when adding the expression "owner" to namespace 105, finds and reserves the grammatical-number variant "owners" (plural) and adds an expression of the appropriate data type to namespace 105. Grammatical-number enforcer 110 issues an error message responsive to subsequent attempts to add grammatical-number variants of component name "owner." In another embodiment grammatical-number enforcer 110 does not automatically add grammatical-number variants of component names to namespace 105, but rather verifies that data types of subsequently declared grammatical-number variants are disallowed. For example, grammatical-number enforcer 110 may reserve component "owner" and allow a subsequent declaration of component "owners" only if the data type assigned to "owners" matches that of component "owner".

Namespace 105 can be a high-level namespace that encompasses multiple, lower-level namespaces. Grammatical-number enforcer 110 can provide type enforcement for grammatical-number variants across all levels of a namespace hierarchy or across subsets of namespaces in the same hierarchy. For example, type enforcement of grammatical-number variants may be automated for a namespace and all included sub-namespaces but not across separate namespaces within a larger namespace.

Figure 2:
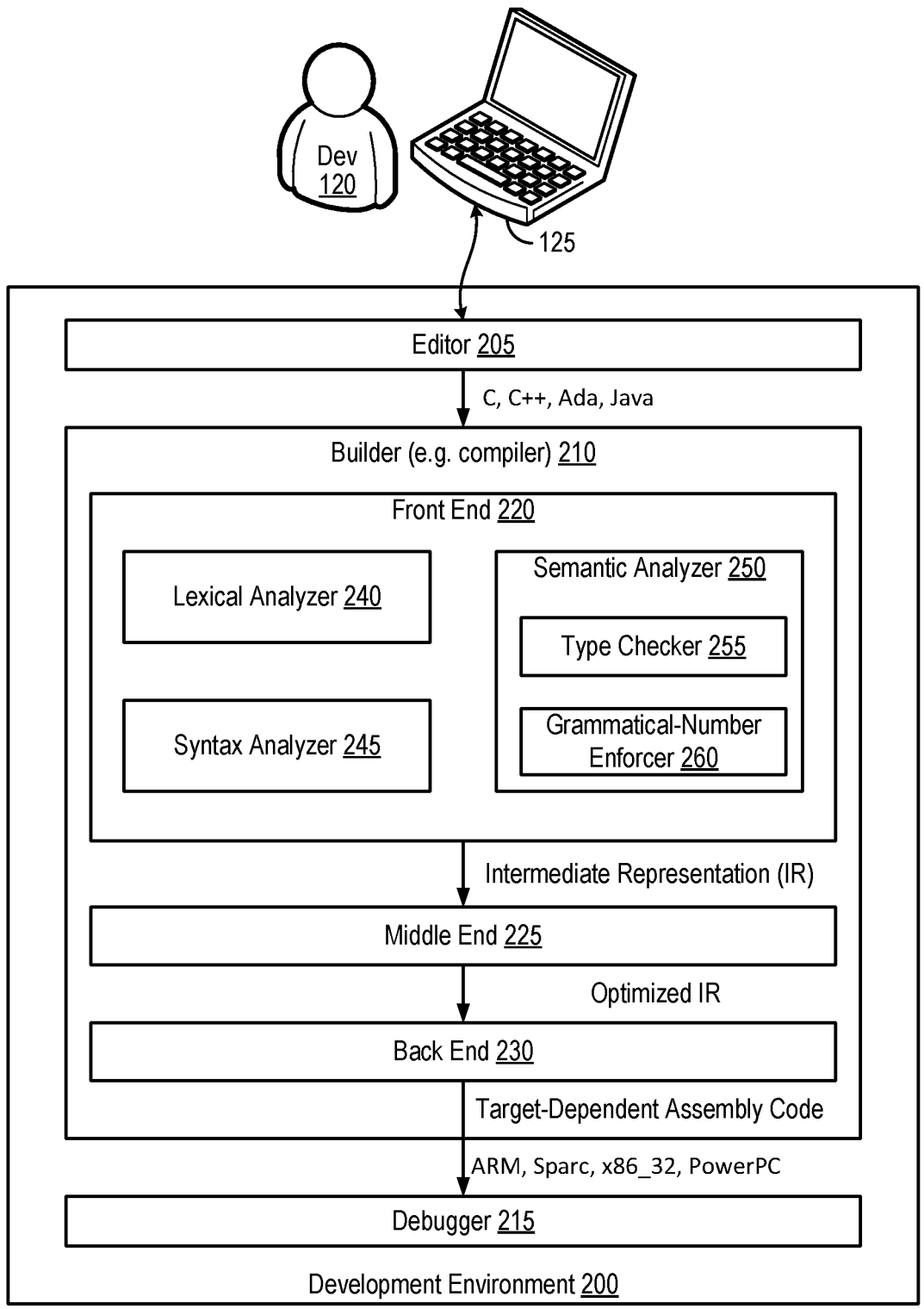
FIG. 2 depicts a software development environment 200 that supports grammatical-number enforcement in accordance with one embodiment.

FIG. 2 depicts a software development environment 200 that supports grammatical-number enforcement in accordance with one embodiment. Development environment 200 is a computer system that programmers use to create and maintain computer programs, and is generally distinct from a production environment in which end users make use of the program. Though shown with a single programmer 120 for ease of illustration, many programmers may have access to a given development environment. Grammatical-number enforcement reduces type errors, particularly among disparate programmers, which improves both the reliability of programs under development and the speed of development environment 200.

Development environment 200 includes an editor 205, a builder 210, and a debugger 215. Editor 205 allows programmer 120 to edit a source-code specification of a program under development using a programming language, such as C, C++, Ada, or Java, that is logically and stylistically understandable a human reader. Builder 210, a compiler in this example, processes source code into a machine language suitable for the computer or computers that are the target of the program under development. Popular machine languages include ARM, Sparc, X86_32, and PowerPC. The last of the three elements of development environment 200, debugger 215, detects and corrects errors in the machine code from builder 210.

Builder 210 is, in this example, a compiler that is logically divided into a front end 220, a middle end 225, and a back end 230. Front end 145 transforms the source code from editor 205 into an intermediate representation (IR), usually a lower-level representation of the source code. Though beyond the scope of this disclosure, other types of builders can benefit from grammatical-number enforcement as detailed herein. For example, interpreted languages like Perl, Ruby or Python can use e.g. an interpreter in lieu of a compiler to convert source code into machine code.

Front end 220 include three modules that can execute sequentially or concurrently, a lexical analyzer 240, a syntax analyzer 245, and a semantic analyzer 250. Lexical analyzer 240 breaks the source code text into pieces, or "lexical tokens," which are analogous to parts of speech in linguistics. Different programming languages have different tokens, but common categories include identifiers (e.g. type and variable names), keywords, separators, operators, literals, and comments. Syntax analyzer 245 builds a logical representation, sometimes called a "parse tree," of the linear sequence of tokens from lexical analyzer 240.

Semantic analyzer 250 adds semantic information to the parse tree from syntax analyzer 245 and builds the symbol table. Among other functions, semantic analyzer 250 includes a type checker 255 that verifies and enforces type constraints on the expressions in a namespace or namespaces within which the program under development is confined. Semantic analyzer 250 additionally includes a grammatical-number enforcer 260 that performs in the manner detailed in connection with FIG. 1.

Middle end 225 can perform various optimizations on the intermediate representation from front end 220. These optimizations can be independent of the languages used to express the source code or the machine code, which beneficially enables generic optimizations to be shared between versions of the compiler supporting different languages and target processors. Back end 230 converts the optimized intermediate representation into target-dependent assembly code.

Although the invention has been described in connection with specific embodiments, variations of these embodiments will be obvious to those of ordinary skill in the art. The following list provides further examples of data types with related descriptive names of varying grammatical numbers.

type: Person
  properties:
    {ID} (ID)
    Name (String)
type: Post
  properties:
{Title} (String)
  Content (String)
  Created (DateTime)
type: Party
properties:
  {Name} (String)
relationship: Authorship (Person to Post, many authors to many posts)
relationship: Guardianship (Person to Person, many guardians to many children)
plurals:
person:people
  child:children
  y:ies
  p=Posts.(title=="Hello")
  all=Posts.titles
  first=first_authorship.author
  all_partying=Parties
  joes=People.(name contains "Joe")
  kid=random_guardianship.child
  joes=People.(name contains "Joe")
  kid=random_guardianship.child One of ordinary skill in the art can appreciate that type enforcement of grammatical-number variants can be implemented using any electronic device, which can be deployed as part of a computer network, or in a distributed computing environment. In this regard, the present invention pertains to any computer system or environment having any number of memory or storage units, and any number of applications and processes occurring across any number of storage units or volumes, which may be used with processes for creating or modifying program code either by human or automated programmers. The disclosed embodiments may apply to an environment with server computers and client computers deployed in a network environment or distributed computing environment, having remote or local storage. The disclosed embodiments may also be applied to standalone computing devices, having programming language functionality, interpretation and execution capabilities for creating or editing programing code.

Unless context dictates otherwise, the conjunction "or" is used herein in the logical sense to mean one, the other, or both. Modifications and variations likewise fall within the scope of the appended claims. Therefore, the spirit and scope of the claims should not be limited to the foregoing description. Only those claims specifically reciting "means for" or "step for" should be construed in the manner required under the sixth paragraph of 35 U.S.C. § 112.

What is claimed is:

1. A method of enforcing a naming convention within a namespace of expressions, the method comprising:
  receiving a first request to create, in the namespace of expressions, a first expression of a grammatical number and a first data type, the first request including a descriptive name of the first expression and the grammatical number;
  adding, responsive to the first request, the first expression of the grammatical number and the first data type to the namespace of expressions;
  receiving a second request to create in the namespace of expressions a second expression of a second data type different from the first data type, the second request including a grammatical-number variant of the descriptive name; and
  issuing an error message response to the second request.

2. The method of claim 1, further comprising adding, responsive to the first request, a third expression of a second grammatical number and the first data type to the namespace of expressions, the third expression including the grammatical-number variant of the descriptive name.

3. The method of claim 2, further comprising adding, responsive to the first request, a fourth expression of the first data type to the namespace of expressions, the fourth expression including a second grammatical-number variant of the descriptive name.

4. The method of claim 1, wherein the grammatical number is one.

5. The method of claim 1, wherein the grammatical number is more than one.

6. The method of claim 1, the first request further comprising a component name of the first expression, the component name of a first component-name data type.

7. The method of claim 6, further comprising:
  receiving a third request to create in the namespace of expressions a third expression with a grammatical-number variant of the component name; and issuing a second error message responsive to the third request.

8. The method of claim 7, the grammatical-number variant of the component name having a second component-name data type, the method further comprising comparing the first component-name data type with the second component-name data type.

9. The method of claim 8, further comprising issuing a second error message response to a mismatch between the first component-name data type and the second component-name data type.

10. The method of claim 1, wherein the first request is authored by a first programmer and the second request is authored by a second programmer.

11. A software-development environment instantiated on a computer system including a processor and a memory, the computer system having access to a namespace of expressions in the memory, the software-development environment comprising:
   an editor to receive a source-code expression of a computer program; and
   a semantic analyzer coupled to the editor, the semantic analyzer to extract from the source-code expression:
   a first request to create, in the namespace of expressions, a first expression of a grammatical number and a first data type, the first request including a descriptive name of the first expression and the grammatical number; and
   a second request to create, in the namespace of expressions, a second expression of a second data type different from the first data type, the second request including a grammatical-number variant of the descriptive name;
   the semantic analyzer including a grammatical-number enforcer to issue an error message responsive to the second request.

12. The software-development environment of claim 11, the grammatical-number enforcer to add to the namespace of expressions, responsive to the first request, a third expression of the first data type and including the grammatical-number variant of the descriptive name of the first expression.

13. The software-development environment of claim 11, the semantic analyzer to add the descriptive name to the namespace of expressions responsive to the first request.

14. The software-development environment of claim 13, the semantic analyzer to add the grammatical-number variant of the descriptive name to the namespace of expressions responsive to the first request.

15. The software-development environment of claim 14, the semantic analyzer to add the grammatical-number variant of the descriptive name to the namespace of expressions responsive to a third request.

16. A computer-implemented method for creating and maintaining data in memory for a computer program, the method comprising:
   receiving a request to associate a data type for the computer program with a first expression having a descriptive name;
   determining, responsive to the request to associate the data type for the computer program with the first expression, a grammatical number of the descriptive name and a grammatical-number variant of the descriptive name;
   reserving the first expression of the data type and the descriptive name in the memory; and
   reserving a second expression of the data type in the memory, the second expression including the grammatical-number variant of the descriptive name.

17. The computer-implemented method of claim 16, further comprising adding the descriptive name to a namespace responsive to the request to associate the data type for the computer program with the first expression.

18. The computer-implemented method of claim 17, further comprising adding the grammatical-number variant of the descriptive name to the namespace responsive to the request to associate the data type for the computer program with the first expression.

19. The computer-implemented method of claim 17, further comprising adding the grammatical-number variant of the descriptive name to the namespace responsive to a second request to associate the data type for the computer program with the grammatical-number variant of the descriptive name.

* * * * *